(12) United States Patent
Chadwick et al.

(10) Patent No.: US 8,654,896 B2
(45) Date of Patent: Feb. 18, 2014

(54) CLOCK RECOVERY APPARATUS AND METHOD THEREOF

(75) Inventors: Simon Chadwick, Reading (GB); Nigel Hoult, Reading (GB)

(73) Assignee: Thales Holdings UK PL, Surrey (GB)

( * ) Notice: Subject to any disclaimer, the term of this patent is extended or adjusted under 35 U.S.C. 154(b) by 0 days.

(21) Appl. No.: 13/401,420

(22) Filed: Feb. 21, 2012

(65) Prior Publication Data

US 2012/0294389 A1   Nov. 22, 2012

(30) Foreign Application Priority Data

Feb. 21, 2011   (GB) ................................. 1102992.3

(51) Int. Cl.
   *H04L 27/00* (2006.01)
(52) U.S. Cl.
   USPC ........................................................ 375/316
(58) Field of Classification Search
   USPC ................. 375/316, 326, 348, 355, 354, 371; 331/25, 34, 57; 327/91, 291
   See application file for complete search history.

(56) References Cited

U.S. PATENT DOCUMENTS

| | | | |
|---|---|---|---|
| 3,440,548 A | 4/1969 | Saltzberg | |
| 5,537,442 A | 7/1996 | Nakamura | |
| 5,586,150 A | 12/1996 | Balasubramaniam | |
| 5,602,879 A | 2/1997 | Wada | |
| 6,084,931 A | 7/2000 | Powell et al. | |
| 6,337,650 B1 | 1/2002 | Mitsutani | |
| 6,731,697 B1 | 5/2004 | Boccuzzi et al. | |
| 2001/0031028 A1* | 10/2001 | Vaucher | 375/355 |
| 2004/0141567 A1 | 7/2004 | Yang | |
| 2005/0147194 A1* | 7/2005 | Koenenkamp | 375/348 |
| 2009/0219983 A1* | 9/2009 | Gerfers et al. | 375/232 |

FOREIGN PATENT DOCUMENTS

GB   2 300 790 A   11/1996

OTHER PUBLICATIONS

European Search Report issued in corresponding European Patent Application No. 12 15 5215 dated May 8, 2012.
Great Britain Search Reporting issued in corresponding British Patent Application No. 1102992.3 dated Jun. 16, 2011.

* cited by examiner

*Primary Examiner* — Khai Tran
(74) *Attorney, Agent, or Firm* — Stroock & Stroock & Lavan LLP

(57) ABSTRACT

A method of recovering a clock signal from a digital signal in a receiver includes generating a representation of an eye diagram from symbols of the digital signal, in which the symbols are sampled at a sample rate such that the representation of the eye diagram is generated by a plurality of samples. The generated representation is converted into an array of data elements having a first set of data corresponding to the plurality of samples, and a second set of data representing a plurality of data bins. A plurality of measurements are performed on the array of data elements and/or the eye diagram to obtain a plurality of measurement outputs corresponding to the plurality of samples, which are combined at each sample. A sample is selected as a clock sample based on results of the combination.

22 Claims, 6 Drawing Sheets

| Sample | 1 | 2 | 3 | 4 | 5 | 6 | 7 | 8 | 9 | 10 | 11 | 12 |
|---|---|---|---|---|---|---|---|---|---|---|---|---|
| Bin | | | | | | | | | | | | |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 9 | 9 | 9 | 9 | 0 | 5 | 5 | 5 |
| 5 | 5 | 0 | 1 | 9 | 0 | 5 | 6 | 11 | 20 | 11 | 6 | 0 |
| 6 | 5 | 10 | 4 | 5 | 5 | 1 | 5 | 0 | 0 | 4 | 5 | 6 |
| 7 | 1 | 0 | 9 | 0 | 1 | 1 | 0 | 0 | 0 | 0 | 4 | 4 |
| 8 | 0 | 1 | 0 | 0 | 0 | 4 | 0 | 0 | 0 | 0 | 0 | 1 |
| 9 | 4 | 9 | 5 | 1 | 5 | 0 | 0 | 0 | 0 | 0 | 0 | 4 |
| 10 | 1 | 0 | 0 | 0 | 0 | 0 | 0 | 0 | 0 | 0 | 0 | 0 |
| 11 | 13 | 0 | 0 | 0 | 0 | 0 | 0 | 0 | 0 | 0 | 0 | 0 |
| 12 | 0 | 4 | 0 | 10 | 0 | 0 | 0 | 0 | 0 | 0 | 0 | 6 |
| 13 | 0 | 1 | 0 | 0 | 0 | 0 | 0 | 0 | 0 | 0 | 6 | 4 |
| 14 | 6 | 16 | 13 | 12 | 11 | 11 | 6 | 0 | 0 | 4 | 10 | 6 |
| 15 | 6 | 0 | 4 | 0 | 6 | 6 | 11 | 17 | 34 | 19 | 6 | 6 |
| 16 | 0 | 0 | 5 | 0 | 0 | 0 | 1 | 17 | 0 | 11 | 6 | 0 |
| 17 | 0 | 0 | 1 | 0 | 0 | 1 | 16 | 0 | 0 | 0 | 6 | 6 |
| 18 | 13 | 0 | 5 | 0 | 6 | 16 | 0 | 0 | 0 | 0 | 0 | 6 |
| 19 | 0 | 13 | 0 | 6 | 7 | 0 | 0 | 0 | 0 | 0 | 0 | 0 |
| 20 | 0 | 5 | 19 | 6 | 0 | 0 | 0 | 0 | 0 | 0 | 0 | 0 |
| 21 | 0 | 6 | 6 | 11 | 4 | 0 | 0 | 0 | 0 | 0 | 0 | 0 |
| 22 | 7 | 6 | 0 | 11 | 7 | 0 | 0 | 0 | 0 | 0 | 0 | 0 |
| 23 | 10 | 1 | 0 | 0 | 10 | 6 | 0 | 0 | 0 | 0 | 0 | 6 |
| 24 | 1 | 0 | 0 | 1 | 1 | 11 | 12 | 0 | 0 | 0 | 12 | 11 |
| 25 | 0 | 0 | 0 | 0 | 0 | 1 | 5 | 13 | 0 | 12 | 5 | 1 |
| 26 | 0 | 0 | 0 | 1 | 0 | 0 | 1 | 17 | 30 | 12 | 1 | 0 |
| 27 | 6 | 0 | 0 | 0 | 0 | 6 | 12 | 0 | 0 | 6 | 6 | 6 |
| 28 | 0 | 6 | 6 | 10 | 6 | 6 | 0 | 0 | 0 | 0 | 6 | 0 |
| 29 | 0 | 0 | 0 | 0 | 0 | 0 | 0 | 0 | 0 | 0 | 0 | 6 |
| 30 | 6 | 0 | 1 | 0 | 10 | 0 | 0 | 0 | 0 | 0 | 0 | 0 |
| 31 | 0 | 6 | 0 | 6 | 1 | 0 | 0 | 0 | 0 | 0 | 0 | 0 |
| 32 | 0 | 0 | 0 | 0 | 0 | 0 | 0 | 0 | 0 | 0 | 0 | 0 |
| 33 | 0 | 1 | 16 | 0 | 0 | 0 | 0 | 0 | 0 | 0 | 0 | 0 |
| 34 | 0 | 12 | 6 | 12 | 0 | 5 | 0 | 0 | 0 | 0 | 0 | 0 |
| 35 | 13 | 4 | 0 | 0 | 12 | 6 | 5 | 0 | 0 | 0 | 0 | 6 |
| 36 | 4 | 0 | 0 | 0 | 0 | 6 | 12 | 17 | 17 | 17 | 17 | 11 |
| 37 | 0 | 0 | 0 | 0 | 0 | 0 | 0 | 0 | 0 | 0 | 0 | 0 |
| 38 | 0 | 0 | 0 | 0 | 0 | 0 | 0 | 0 | 0 | 0 | 0 | 0 |
| 39 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 |
| 41 | 0 | 0 | 0 | 0 | 0 | 0 | 0 | 0 | 0 | 0 | 0 | 0 |

FIGURE 4

| Sample | 1 | 2 | 3 | 4 | 5 | 6 | 7 | 8 | 9 | 10 | 11 | 12 |
|---|---|---|---|---|---|---|---|---|---|---|---|---|
| Bin | | | | | | | | | | | | |
| 1 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 0 | 0 | 0 | 0 | 0 |
| 4 | 0 | 0 | 0 | 0 | 9 | 9 | 9 | 9 | 0 | 5 | 5 | 5 |
| 5 | 0 | 0 | 0 | 0 | 0 | 0 | 0 | 0 | 0 | 0 | 0 | 0 |
| 6 | 5 | 10 | 4 | 5 | 5 | 1 | 5 | 0 | 0 | 4 | 5 | 6 |
| 7 | 2 | 0 | 18 | 0 | 2 | 2 | 0 | 0 | 0 | 0 | 8 | 8 |
| 8 | 0 | 3 | 0 | 0 | 0 | 12 | 0 | 0 | 0 | 0 | 0 | 3 |
| 9 | 16 | 36 | 20 | 4 | 20 | 0 | 0 | 0 | 0 | 0 | 0 | 16 |
| 10 | 5 | 0 | 0 | 0 | 0 | 0 | 0 | 0 | 0 | 0 | 0 | 0 |
| 11 | 65 | 0 | 0 | 0 | 0 | 0 | 0 | 0 | 0 | 0 | 0 | 0 |
| 12 | 0 | 16 | 0 | 40 | 0 | 0 | 0 | 0 | 0 | 0 | 0 | 24 |
| 13 | 0 | 3 | 0 | 0 | 0 | 0 | 0 | 0 | 0 | 0 | 18 | 12 |
| 14 | 12 | 32 | 26 | 24 | 22 | 22 | 12 | 0 | 0 | 8 | 20 | 12 |
| 15 | 6 | 0 | 4 | 0 | 6 | 6 | 11 | 17 | 34 | 19 | 6 | 6 |
| 16 | 0 | 0 | 0 | 0 | 0 | 0 | 0 | 0 | 0 | 0 | 0 | 0 |
| 17 | 0 | 0 | 1 | 0 | 0 | 1 | 16 | 0 | 0 | 0 | 6 | 6 |
| 18 | 26 | 0 | 10 | 0 | 12 | 32 | 0 | 0 | 0 | 0 | 0 | 12 |
| 19 | 0 | 39 | 0 | 18 | 21 | 0 | 0 | 0 | 0 | 0 | 0 | 0 |
| 20 | 0 | 20 | 76 | 24 | 0 | 0 | 0 | 0 | 0 | 0 | 0 | 0 |
| 21 | 0 | 30 | 30 | 55 | 20 | 0 | 0 | 0 | 0 | 0 | 0 | 0 |
| 22 | 28 | 24 | 0 | 44 | 28 | 0 | 0 | 0 | 0 | 0 | 0 | 0 |
| 23 | 30 | 3 | 0 | 0 | 30 | 18 | 0 | 0 | 0 | 0 | 0 | 18 |
| 24 | 2 | 0 | 0 | 2 | 2 | 22 | 24 | 0 | 0 | 0 | 24 | 22 |
| 25 | 0 | 0 | 0 | 0 | 0 | 1 | 5 | 13 | 0 | 12 | 5 | 1 |
| 26 | 0 | 0 | 0 | 0 | 0 | 0 | 0 | 0 | 0 | 0 | 0 | 0 |
| 27 | 6 | 0 | 0 | 0 | 0 | 6 | 12 | 0 | 0 | 6 | 6 | 6 |
| 28 | 0 | 12 | 12 | 20 | 12 | 12 | 0 | 0 | 0 | 0 | 12 | 0 |
| 29 | 0 | 0 | 0 | 0 | 0 | 0 | 0 | 0 | 0 | 0 | 0 | 18 |
| 30 | 24 | 0 | 4 | 0 | 40 | 0 | 0 | 0 | 0 | 0 | 0 | 0 |
| 31 | 0 | 30 | 0 | 30 | 5 | 0 | 0 | 0 | 0 | 0 | 0 | 0 |
| 32 | 0 | 0 | 0 | 0 | 0 | 0 | 0 | 0 | 0 | 0 | 0 | 0 |
| 33 | 0 | 4 | 64 | 0 | 0 | 0 | 0 | 0 | 0 | 0 | 0 | 0 |
| 34 | 0 | 36 | 18 | 36 | 0 | 15 | 0 | 0 | 0 | 0 | 0 | 0 |
| 35 | 26 | 8 | 0 | 0 | 24 | 12 | 10 | 0 | 0 | 0 | 0 | 12 |
| 36 | 4 | 0 | 0 | 0 | 0 | 6 | 12 | 17 | 17 | 17 | 17 | 11 |
| 37 | 0 | 0 | 0 | 0 | 0 | 0 | 0 | 0 | 0 | 0 | 0 | 0 |
| 38 | 0 | 0 | 0 | 0 | 0 | 0 | 0 | 0 | 0 | 0 | 0 | 0 |
| 39 | 0 | 0 | 0 | 0 | 0 | 0 | 0 | 0 | 0 | 0 | 0 | 0 |
| 40 | 0 | 0 | 0 | 0 | 0 | 0 | 0 | 0 | 0 | 0 | 0 | 0 |
| 41 | 0 | 0 | 0 | 0 | 0 | 0 | 0 | 0 | 0 | 0 | 0 | 0 |
| Total | 257 | 306 | 287 | 302 | 258 | 177 | 116 | 56 | 51 | 71 | 132 | 198 |

FIGURE 7

CLOCK RECOVERY APPARATUS AND METHOD THEREOF

FIELD OF THE INVENTION

The present invention relates to a clock recovery apparatus and a method thereof for recovering a clock signal in a digital receiver.

BACKGROUND OF THE INVENTION

In digital communications, different modulation techniques can be used to modulate digital information onto a carrier signal. In a demodulator of a receiver, a clock signal is recovered from a received signal, so that the received signal is sampled by the recovered clock signal to retrieve digital data. Therefore, clock recovery is a critical function of a digital communications system in order to obtain accurate symbol identification.

A number of existing clock recovery methods focus on taking averages of "zero crossing" positions of a received signal over a large number of samples. Essentially, the receiver detects the change of polarity of the received signal and compares its location with predicted sampling points. If the change of the polarity occurs in the middle of two sampling points, the predicted sampling instant is deemed correct. However, if the change of polarity does not occur in the middle, the reconstructed clock will be altered accordingly.

However, it is noted that in short or noisy signals the averages of the zero crossings may not be sufficiently accurate. This is due to the small number of crossings or spurious noise crossings that result in incorrect point selection and poor data error rates.

Furthermore, it is also noted that there are other existing clock recovery methods that do not perform well with four-level modulation schemes. Generally, these methods utilise a training sequence to improve convergence, which is not practical for short signals.

It is thus desirable to provide a method of performing clock recovery to recover the data sampling clock from short and noisy signals.

SUMMARY OF THE INVENTION

In a first aspect of the invention there is provided a method of recovering a clock signal from a digital signal in a receiver, the method comprising generating a representation of an eye diagram from a plurality of symbols of said digital signal, wherein said plurality of symbols are sampled at a sample rate such that said representation of said eye diagram is generated by a plurality of samples, converting said generated eye diagram into an array of data elements, said array having a first set of data corresponding to said plurality of samples, and a second set of data representing a plurality of data bins, wherein each of said plurality of data bins includes a bin count, performing a plurality of measurements on said array of data elements and/or said representation of said eye diagram to obtain a plurality of measurement outputs corresponding to said plurality of samples, combining said plurality of measurement outputs at each sample, and selecting a sample as a clock sample based on results of said combination.

The step of performing measurements may include modifying said plurality of measurement outputs.

Said modifying said plurality of measurement outputs may include normalising said outputs such that said outputs are of the same unit scale.

In one embodiment of the invention, the step of performing measurements may include determining occupancy of an eye of said representation of said eye diagram using said array of data elements.

Said determining occupancy of said eye of said representation of said eye diagram may include determining said bin count for each sample at a data bin located substantially in the middle of said plurality of said data bins, and at data bins adjacent to said data bin located substantially in the middle of said plurality of said data bins, and adding said bin counts for each sample.

In an embodiment of the above aspect, the step of performing measurements may include determining a plurality of convergence points of said representation of said eye diagram using said array of data elements.

Said determining a plurality of convergence points may include correlating bin counts for each said sample against an ideal bin count pattern.

In one embodiment, the step of performing measurements may include determining level of change in bin count between data bins that are adjacent to a data bin located substantially in the middle of said plurality of data bins.

In another embodiment of the invention, the step of said performing measurements may include determining a further bin count for each of said data bins of each sample and summing said determined bin value for said each sample.

Said determining a further bin count may include determining a distance between each of said data bins and at least one expected bin, and multiplying said bin count of each of said data bins by said determined distance.

In one embodiment, the step of performing measurements may include determining an average magnitude of said plurality of symbols at each sample.

In a further embodiment, the step of performing measurements may include determining, at each sample, the number of data bins that includes a non-zero bin count.

In another embodiment of the invention, the step of performing measurements may include determining the number of zero crossings at each sample of said representation of said eye diagram, selecting a sample having the most number of zero crossings, and adding a constant value to said sample.

In a second aspect of the invention there is provided an apparatus for recovering a clock signal from a digital signal in a receiver, the apparatus comprising generating means for generating a representation of an eye diagram from a plurality of symbols of said digital signal, wherein said plurality of symbols are sampled at a sample rate such that said representation of said eye diagram is generated by a plurality of samples, converting means for converting said generated representation into an array of data elements, said array having a first set of data corresponding to said plurality of samples, and a second set of data representing a plurality of data bins, wherein each of said plurality of data bins includes a bin count, processing means for performing a plurality of measurements on said array of data elements and/or said representation of said eye diagram to obtain a plurality of measurement outputs corresponding to said plurality of samples, and wherein said processing means is further operable to combine said plurality of measurement outputs at each sample, and to select a sample as a clock sample based on results of said combination.

The above aspects of the invention can be incorporated into a specific hardware device, a general purpose device configured by suitable software, or a combination of both. The invention can be embodied in a software product, either as a complete software implementation of the invention, or as an add-on component for modification or enhancement of existing software (such as a plug in). Such a software product could be embodied in a carrier medium, such as a storage medium (e.g. an optical disk or a mass storage memory such as a FLASH memory) or a signal medium (such as a download). Specific hardware devices suitable for the embodiment of the invention could include an application specific device such as an ASIC, an FPGA or a DSP, or other dedicated functional hardware means. The reader will understand that none of the foregoing discussion of embodiment of the invention in software or hardware limits future implementation of the invention on yet to be discovered or defined means of execution.

BRIEF DESCRIPTION OF THE DRAWINGS

In the following, embodiments of the invention will be explained in more detail with reference to the drawings, in which:

FIG. 4 illustrates an array of data representing the four level eye diagram of FIG. 2;

FIG. 7 illustrates a detail calculation of measurement 4 according to an embodiment of the invention.

DETAILED DESCRIPTION

Specific embodiments of the present invention will be described in further detail on the basis of the attached diagrams. It will be appreciated that this is by way of example only, and should not be viewed as presenting any limitation on the scope of protection sought.

Figure 1:
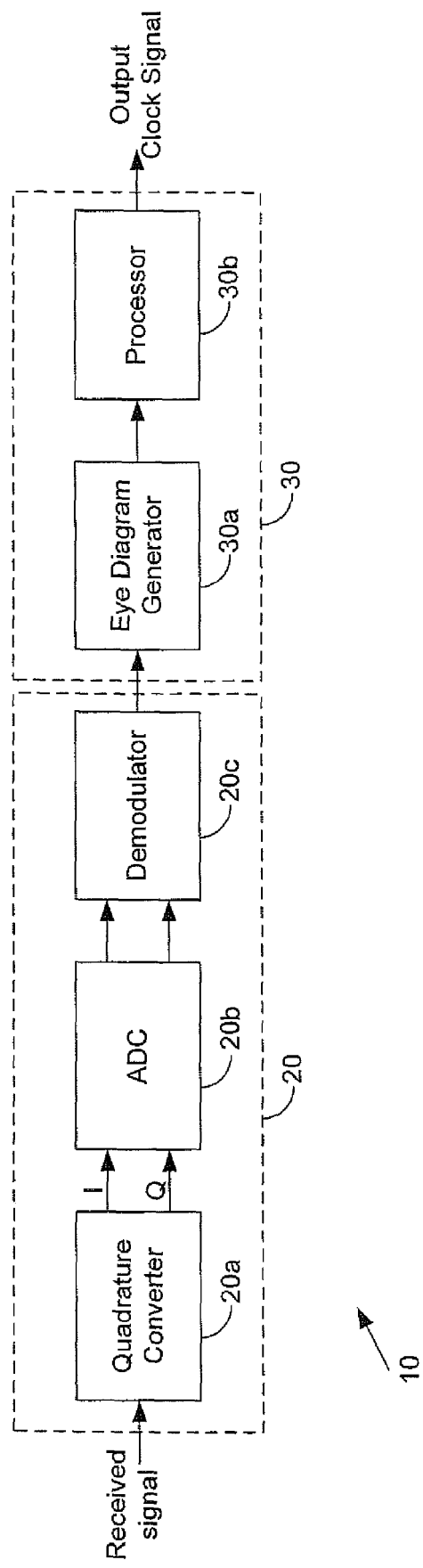
FIG. 1 illustrates a receiver according to an embodiment of the invention.

FIG. 1 illustrates a block diagram representation of a receiver 10 in accordance with embodiments of the present invention. The receiver 10 includes a demodulator section 20 and a clock recovery section 30. The demodulator section 20 includes a quadrature converter 20a for converting a received input signal into an in-phase component (I channel) and a quadrature component (Q channel). The converted signals are sampled and quantised by an analog-to-digital converter (ADC) 20b that converts the received signal to a digital signal for processing. The converted digital signal is then demodulated by a demodulator 20c. The output of the demodulator is a single serial stream produced from the in-phase component and the quadrature component. The output of the demodulator is passed to the clock recovery section.

As illustrated in FIG. 1, the clock recovery section 30 in accordance with an embodiment of the invention comprises an eye diagram generator 30a that generates data representations of an eye diagram, by obtaining the output signal of the demodulator and overlapping traces of the signal for a number of symbols to reveal the signal characteristics. It will be appreciated by the person skilled in the art that any suitable methods for generating the data representing the eye diagram may be employed. For this reason, details of generating eye pattern data will not be described.

Figure 2:
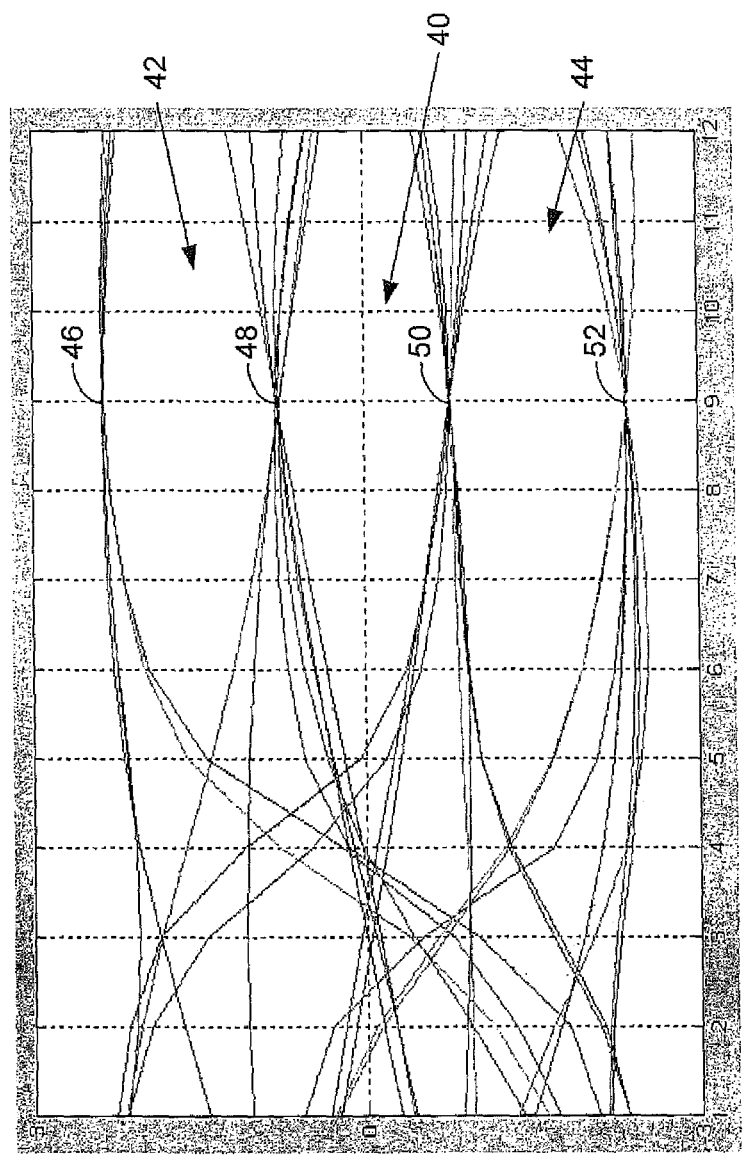
FIG. 2 is an exemplary four level eye diagram according to an embodiment of the invention.

FIG. 2 illustrates the output signal of the demodulator being overlaid every bit period, providing an open eye. The example illustrated in FIG. 2 is a representation of an eye diagram generated from a $\pi/4$ DQPSK (differential quadrature phase-shift keying) modulated signal, that produces a four level eye diagram once it is demodulated. In this eye diagram, the x-axis represents the samples and the y-axis represents the frequency of the signal. In this example, the sample rate is 12 times the symbol rate, and each symbol represents two bits, i.e. 00, 01, 10, 11. The skilled person in the art would appreciate that the opening of the eye 40, between samples 5 and 12, indicates the time over which the clock sample is likely to be found. Therefore, the most open part of the eye diagram, sample 9 in this example, represents the time in which a clock signal is to be extracted.

The manner in which the most open part of the eye diagram is detected will now be described in detail.

Referring to FIG. 1, the clock recovery section of the receiver further includes a signal processor 30b operable to process the eye diagram data to extract a clock signal.

The signal processor 30b is operable to execute machine code instructions stored in a working memory (not shown) and/or retrievable from a mass storage unit (not shown). The signal processor 30b processes the eye diagram data in accordance with the method described in the forthcoming paragraphs. For clarity, a flow diagram is also included in FIG. 3.

An exemplary method according to an embodiment of the invention will be discussed with reference to the flowchart of FIG. 3. The method commences by converting the eye diagram data into an array of data representation in step 100. As shown in FIG. 4, the array of data representation consists of 12 columns representing the samples of the eye diagram data, and 41 rows representing 41 data bins. Each sample point of the eye diagram is split into 41 equally sized bins representing the frequency range of −3 to 3 of the eye diagram, such that the number quoted for each bin denotes the number of symbol counts at a corresponding position in the eye diagram. For convenience, the number of symbol counts will be herein referred to as "bin count".

In step 102 of FIG. 3, a number of measurements are carried out on the data representation to determine the correct clock sample, which will be described in further detail in the forthcoming paragraphs.

Measurement 1

This measurement determines the occupancy of the central eye—the region 40 in FIG. 2. In this measurement, the bin counts for the bins at, or on either side of the, central bin (i.e. 21, 20, and 22 in FIG. 4) are added at each sample point. At the correct clock sample, the bin count is expected to be zero. In this example, as shown in Table 1 samples 6, 7, 8, 9, 10, 11, and 12 are possible candidates for the correct clock sample.

TABLE 1

| Sample | 1 | 2 | 3 | 4 | 5 | 6 | 7 | 8 | 9 | 10 | 11 | 12 |
|---|---|---|---|---|---|---|---|---|---|---|---|---|
| Total bin counts | 7 | 17 | 25 | 28 | 11 | 0 | 0 | 0 | 0 | 0 | 0 | 0 |

This approach can also be extended to include bin counts for bins at the upper and lower eyes (in regions 42 and 44 respectively).

Measurement 2

This measurement determines the open eyes (i.e. regions 40, 42, and 44) of the eye diagram by determining the position of four convergence points (points 46, 48, 50, and 52) of the eye diagram. The skilled person would appreciate that the number of convergence points are different for different modulation schemes.

The measurement determines the position of the four convergence points by correlating bin counts for each sample against an ideal bin count pattern. Therefore, samples that appear close to the ideal bin count pattern will have high correlation. In this example, sample point 9 is the highest correlated sample to the ideal bin count pattern, and sample point 3 is the lowest correlation measure.

Figure 5:
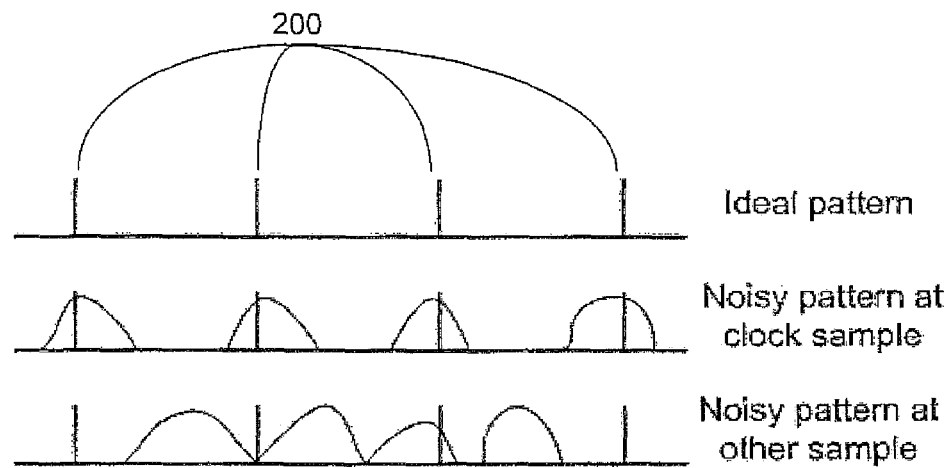
FIG. 5 is an illustration of an ideal bin count pattern and bin count patterns at different samples.

FIG. 5 illustrates examples of an ideal bin count pattern, a bin count pattern at the correct clock sample (in this example, sample 9) and a bin count pattern at the incorrect clock sample (sample 3 in this example). In FIG. 5, the ideal bin count pattern is represented by four predefined points 200 separated at fixed intervals.

Figure 6:
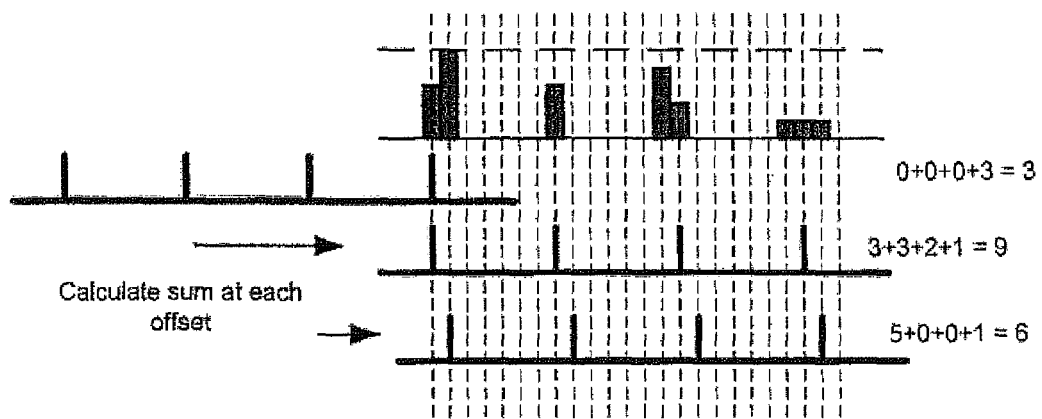
FIG. 6 illustrates an example of the steps of performing correlation calculation on an array of data.

In this example, the correlation calculation is an accumulative count, which is a summation of bin counts aligned with the four predefined points. The sample that has the highest accumulation count indicates that it is also the highest correlated sample. This approach is illustrated in FIG. 6.

Measurement 3

This measurement determines the level of change in bin count between bins that are adjacent to the central bin (in this example bin 21 in FIG. 4) at each sample. The measurement determines the level of change in bin count between a current sample and a following sample at bin 21, e.g. between sample 1 and sample 2, and so on. The measurement also includes determining the level of change in bin count between bins that are adjacent to bin 21, i.e. bins 20 and 22.

In this example, in sample 1, the level of change between bin 21 and 20 is 0, and the level of change between bin 21 and 22 is 7. The level of change between samples 1 and 2 at bin 21 is 6. Therefore, the total level of change in bin count for sample 1 is 13. Table 2 provides the total level of change in bin count for each of the sample points.

TABLE 2

| Sample | 1 | 2 | 3 | 4 | 5 | 6 | 7 | 8 | 9 | 10 | 11 | 12 |
|---|---|---|---|---|---|---|---|---|---|---|---|---|
| Total level of change in bin counts | 13 | 7 | 24 | 17 | 18 | 4 | 0 | 0 | 0 | 0 | 0 | 0 |

Therefore, at the correct clock sample, the bin count is expected to be zero. In this example, as shown in Table 2 samples 7, 8, 9, 10, 11, and 12 are possible candidates for the correct clock sample.

Measurement 4

This measurement sums the total distance between the occupied bins and the expected bins (those bins that correspond to the four symbol levels) for each sample.

Given that the expected occupied bins are bins 5, 16, 26 and 37, a sample in bin 6 is a distance 1, and a sample in bin 12 is a distance of 4. The calculation at each bin of a sample is performed by multiplying the number of bin counts in that bin by the distance of that bin from a nearest expected bins.

FIG. 7 illustrates a detail calculation of measurement 4. For example, the number of bin counts at sample 1, bin 6 is 5 (see FIG. 4) and the distance from the nearest expected bins (bin 5) is 1. Therefore, the new total value for bin 6, at sample 1 is 5×1=5.

A summation of the total magnitude of bin values at each sample is then performed. The complete calculations for the sample data are shown in Table 3.

TABLE 3

| Sample | 1 | 2 | 3 | 4 | 5 | 6 | 7 | 8 | 9 | 10 | 11 | 12 |
|---|---|---|---|---|---|---|---|---|---|---|---|---|
| Total bin counts | 257 | 306 | 287 | 302 | 258 | 177 | 116 | 56 | 51 | 71 | 132 | 198 |

In this case, the sample point that has the lowest score corresponds to the correct clock sample. In this example, the results in Table 3 indicate that sample 9 is the correct clock sample.

Measurement 5

This measurement calculates the total magnitude at each sample point of the eye diagram. This is achieved by summing the magnitude values of the samples at a sample point. At the correct clock sample, the magnitude is expected to be the highest.

Measurement 6

This measurement counts the number of occupied (i.e. non-zero) bins at each sample. Essentially, a clean eye diagram is expected to have a minimum number of occupied bins at the clock sample. Table 4 provides the total number of occupied bins for each of the sample points.

TABLE 4

| Sample | 1 | 2 | 3 | 4 | 5 | 6 | 7 | 8 | 9 | 10 | 11 | 12 |
|---|---|---|---|---|---|---|---|---|---|---|---|---|
| Total number of occupied bins | 16 | 16 | 15 | 14 | 16 | 17 | 13 | 7 | 4 | 10 | 15 | 18 |

Measurement 7

Figure 3:
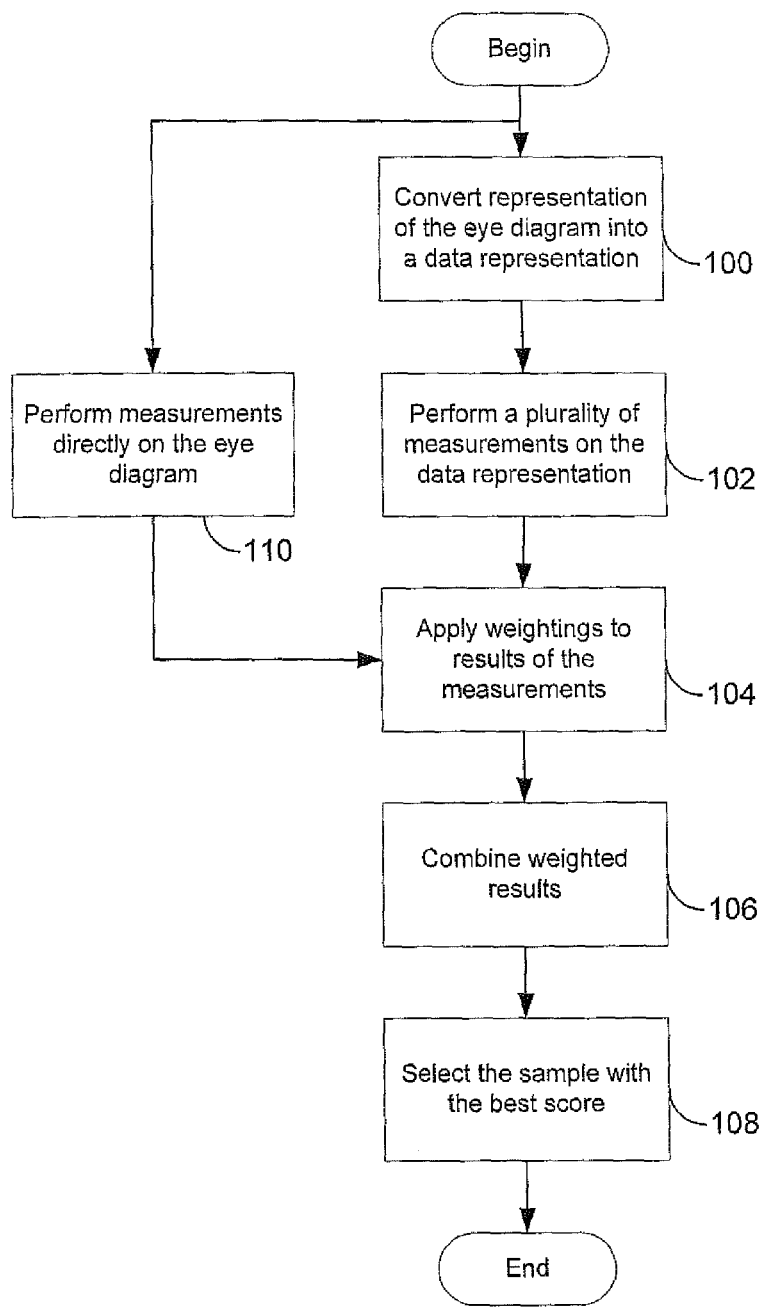
FIG. 3 illustrates a flow diagram of a clock recovery method according to an embodiment of the invention.

This measurement employs the conventional clock recovery approach of detecting zero crossings (see FIG. 3, step 110). This is achieved by stepping through the representation of the eye diagram samples and recording each zero crossing. The skilled person in the art would understand that the sample with the highest recorded number of zero crossings can be identified as the "worst" (noisiest) sample. Based on the understanding that the correct clock sample is a number of samples away from the worst sample, the correct clock sample can therefore be determined by adding a fixed value to the worst sample. In this example, the noisiest sample is sample point 3, and the correct clock sample (sample 9) can be determined by adding a value of 6 to sample point 3.

The result of each measurement is weighted in step 104 to normalise the result such that the results of all the measurements are of the same unit scale. Furthermore, a number of results are adjusted to correspond to the results of other measurements. For example, the result of measurement 1 indicates that the correct clock sample is likely to be a sample with a low bin count (zero in the example described above). Conversely, the result of measurement 5 indicates that the correct clock sample is likely to be a sample with a high bin count. Therefore, in order to attain consistent results, the total bin counts of measurement 5 can be adjusted such that the correct clock sample has the lowest score. The skilled person would appreciate that this can be achieved by applying a weighting factor to the total bin counts for each sample of measurement 5.

Referring back to FIG. 3, in step 106, the weighted results at each sample point of each measurement are combined with the weighted results at the corresponding sample points of other measurements.

In step 108, the sample with the lowest score is selected as the correct sample clock. The clock recovery method described herein can be applied regardless of the type of modulation system, particularly modulation systems that generate data representations of eye diagrams.

While the foregoing specific description of an embodiment of the invention has been provided for the benefit of the skilled reader, it will be understood that it should not be read as mandating any restriction on the scope of the invention. The invention should be considered as characterised by the claims appended hereto, as interpreted with reference to, but not bound by, the supporting description.

The invention claimed is:

1. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes modifying said plurality of measurement outputs, and said modifying said plurality of measurement outputs includes normalising said outputs such that said outputs are of the same unit scale.

2. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining occupancy of an eye of said representation of said eye diagram using said array of data elements.

3. A method according to claim 2, wherein said determining occupancy of said eye of said representation of said eye diagram includes determining said bin count for each sample at a data bin located substantially in the middle of said plurality of said data bins, and at data bins adjacent to said data bin located substantially in the middle of said plurality of said data bins, and adding said bin counts for each sample.

4. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining a plurality of convergence points of said representation of said eye diagram using said array of data elements.

5. A method according to claim 4, wherein said determining a plurality of convergence points includes correlating bins counts for each said sample against an ideal bin count pattern.

6. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;

wherein said step of performing measurements includes determining a level of change in bin count between data bins that are adjacent to a data bin located substantially in the middle of said plurality of data bins.

7. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining a further bin count for each of said data bins of each sample and summing said determined bin value for said each sample.

8. A method according to claim 7, wherein said determining a further bin count includes determining a distance between each of said data bins and at least one expected bin, and multiplying said bin count of each of said data bins by said determined distance.

9. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining an average magnitude of said plurality of symbols at each sample.

10. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining, at each sample, the number of data bins that includes a non-zero bin count.

11. A method of recovering a clock signal from a digital signal in a receiver, the method comprising:
generating a representation of an eye diagram from a plurality of symbols of said digital signal, wherein said plurality of symbols are sampled at a sample rate such that said representation of said eye diagram is generated by a plurality of samples;
converting said generated representation into an array of data elements, said array having a first set of data corresponding to said plurality of samples, and a second set of data representing a plurality of data bins, wherein each of said plurality of data bins includes a bin count;
performing a plurality of measurements on said array of data elements and/or said representation of said eye diagram to obtain a plurality of measurement outputs corresponding to said plurality of samples;
combining said plurality of measurement outputs at each sample; and
selecting a sample as a clock sample based on results of said combination;
wherein said step of performing measurements includes determining the number of zero crossings at each sample of said representation of said eye diagram, selecting a sample having the most number of zero crossings, and adding a constant value to said sample.

12. An apparatus for recovering a clock signal from a digital signal, the apparatus comprising:
a generation component for generating a representation of an eye diagram from a plurality of symbols of said digital signal, wherein said plurality of symbols are sampled at a sample rate such that said representation of said eye diagram is generated by a plurality of samples;
a conversion component means for converting said generated representation into an array of data elements, said array having a first set of data corresponding to said plurality of samples, and a second set of data representing a plurality of data bins, wherein each of said plurality of data bins includes a bin count; and
a processing component means for performing a plurality of measurements on said array of data elements and/or said representation of said eye diagram to obtain a plurality of measurement outputs corresponding to said plurality of samples;
wherein said processing component is further operable to combine said plurality of measurement outputs at each sample, to select a sample as a clock sample based on results of said combination, and to modify said plurality of measurement outputs by normalising said outputs such that said outputs are of the same unit scale.

13. An apparatus for recovering a clock signal from a digital signal, the apparatus comprising:
a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine occupancy of an eye of said representation of said eye diagram using said array of data elements.

14. An apparatus according to claim 13, wherein said processing component is operable to determine occupancy of said eye of said representation of said eye diagram by determining said bin count for each sample at a data bin located substantially in the middle of said plurality of said data bins, and at data bins adjacent to said data bin located substantially in the middle of said plurality of said data bins, and adding said bin counts for each sample.

15. An apparatus for recovering a clock signal from a digital signal, the apparatus comprising:

a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine a plurality of convergence points of said eye diagram using said array of data elements.

16. An apparatus according to claim 15, wherein said processing component is operable to determine said plurality of convergence points by correlating bins counts for each said sample against an ideal bin count pattern.

17. An apparatus for recovering a clock signal from a digital signal, the apparatus comprising:

a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine level of change in bin count between data bins that are adjacent to a data bin located substantially in the middle of said plurality of data bins.

18. An apparatus for recovering a clock signal from a digital signal, the apparatus comprising:

a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine a further bin count for each of said data bins of each sample and summing said determined bin value for said each sample.

19. A apparatus according to claim 18, wherein said processing component is operable to determine said further bin count by determining a distance between each of said data bins and at least one expected bin, and multiplying said bin count of each of said data bins by said determined distance.

20. An apparatus for recovering a clock signal from a digital signal, the apparatus comprising:

a generation component for generating eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine an average magnitude of said plurality of symbols at each sample.

21. An apparatus for recovering a clock signal from a digital signal, the apparatus comprising:

a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine, at each sample, the number of data bins that includes a non-zero bin count.

22. An apparatus for recovering a clock signal from a digital signal, the apparatus comprising:

a generation component for generating a representation of an eye diagram from a plurality of symbols of said digital signal, wherein said plurality of symbols are sampled at a sample rate such that said representation of said eye diagram is generated by a plurality of samples;

a conversion component means for converting said generated representation into an array of data elements, said array having a first set of data corresponding to said plurality of samples, and a second set of data representing a plurality of data bins, wherein each of said plurality of data bins includes a bin count; and a processing component means for performing a plurality of measurements on said array of data elements and/or said representation of said eye diagram to obtain a plurality of measurement outputs corresponding to said plurality of samples;

wherein said processing component is further operable to combine said plurality of measurement outputs at each sample, to select a sample as a clock sample based on results of said combination, and to determine the number of zero crossings at each sample of said representation of said eye diagram, selecting a sample having the most number of zero crossings, and adding a constant value to said sample.

* * * * *

UNITED STATES PATENT AND TRADEMARK OFFICE
CERTIFICATE OF CORRECTION

PATENT NO.        : 8,654,896 B2                                    Page 1 of 1
APPLICATION NO.   : 13/401420
DATED             : February 18, 2014
INVENTOR(S)       : Simon Chadwick et al.

It is certified that error appears in the above-identified patent and that said Letters Patent is hereby corrected as shown below:

On the title page, change the Assignee item [73] as follows:

Change "THALES HOLDINGS UK PL" to: THALES HOLDINGS UK PLC

Signed and Sealed this
Twenty-seventh Day of May, 2014

Michelle K. Lee
*Deputy Director of the United States Patent and Trademark Office*